United States Patent
Seo et al.

(10) Patent No.: US 8,029,195 B2
(45) Date of Patent: Oct. 4, 2011

(54) VEHICULAR-WHEEL BEARING ASSEMBLY

(75) Inventors: Nobuyuki Seo, Nara (JP); Katsura Koyagi, Kashiwara (JP); Masahiro Inoue, Nara (JP)

(73) Assignee: JTEKT Corporation, Osaka-Shi (JP)

( * ) Notice: Subject to any disclaimer, the term of this patent is extended or adjusted under 35 U.S.C. 154(b) by 796 days.

(21) Appl. No.: 11/791,533

(22) PCT Filed: Nov. 24, 2005

(86) PCT No.: PCT/JP2005/021600
§ 371 (c)(1),
(2), (4) Date: May 24, 2007

(87) PCT Pub. No.: WO2006/057310
PCT Pub. Date: Jun. 1, 2006

(65) Prior Publication Data
US 2008/0089629 A1    Apr. 17, 2008

(30) Foreign Application Priority Data

Nov. 25, 2004   (JP) ................................. 2004-340854
Nov. 25, 2004   (JP) ................................. 2004-340855
Nov. 25, 2004   (JP) ................................. 2004-340857
Nov. 25, 2004   (JP) ................................. 2004-340858

(51) Int. Cl.
*F16C 19/08* (2006.01)
*F16C 13/04* (2006.01)

(52) U.S. Cl. .................... 384/544; 384/492; 384/537

(58) Field of Classification Search ............ 384/162, 384/275, 282, 446, 494, 492, 469, 537, 543, 384/544, 549, 551, 569, 615, 625
See application file for complete search history.

(56) References Cited

U.S. PATENT DOCUMENTS

| 1,035,421 | A | | 8/1912 | Coppins |
| 2,866,672 | A | | 12/1958 | Black |
| 3,212,834 | A | * | 10/1965 | Mayer et al. ............. 384/292 |
| 3,782,794 | A | * | 1/1974 | Chmura et al. ........... 384/492 |
| 3,807,817 | A | * | 4/1974 | Black ........................ 384/543 |

(Continued)

FOREIGN PATENT DOCUMENTS

JP    S58-18151    7/1981

(Continued)

OTHER PUBLICATIONS

Microfilm of the specification and drawings annexed to the request of Japanese Utility Model Application No. 68741/1989 (Laid-open No. 7527/1991) (Nippon Thompson Co., Ltd.), Jan. 24, 1991.

*Primary Examiner* — Marcus Charles

(74) *Attorney, Agent, or Firm* — Birch, Stewart, Kolasch & Birch, LLP

(57) ABSTRACT

There is provided a vehicular-wheel bearing assembly. The vehicular-wheel bearing assembly includes an inner shaft (1), an outer ring (2) provided around the inner shaft (1), and two rows of balls (3a and 3b) provided between the inner shaft (1) and the outer ring (2) in angular contact with the inner shaft (1) and the outer ring (2). An annular raceway member (4) with a curved section that is a separate member from the inner shaft (1) and the outer ring (2) and has a raceway surface for the rolling element is provided on an outer peripheral surface (11) of the inner shaft (1) and an inner peripheral surface (12) of the outer ring (2).

9 Claims, 11 Drawing Sheets

U.S. PATENT DOCUMENTS

| | | | |
|---|---|---|---|
| 3,937,535 A | | 2/1976 | Ladin |
| 4,621,700 A | * | 11/1986 | Merkelbach .................. 384/492 |
| 5,150,398 A | * | 9/1992 | Nishioka et al. ............. 384/492 |
| 5,439,297 A | * | 8/1995 | Kitayama ..................... 384/492 |
| 5,518,820 A | * | 5/1996 | Averbach et al. ............ 384/615 |
| 5,618,114 A | * | 4/1997 | Katahira ...................... 384/625 |
| 5,735,614 A | | 4/1998 | Isogawa et al. |
| 5,782,566 A | * | 7/1998 | Bertetti .......................... 384/537 |
| 6,332,714 B1 | * | 12/2001 | Takemura et al. .............. 384/43 |
| 6,523,909 B1 | * | 2/2003 | Nakamura et al. ........... 384/544 |
| 6,682,220 B2 | | 1/2004 | Kobayashi et al. |

FOREIGN PATENT DOCUMENTS

| | | | | |
|---|---|---|---|---|
| JP | H3-7527 | | | 1/1991 |
| JP | 9-72332 A | | | 3/1997 |
| JP | 9-72344 A | | | 3/1997 |
| JP | 2000-310228 A | | | 11/2000 |
| JP | 2002-235757 A | | | 8/2002 |
| JP | 2002235757 A | * | | 8/2002 |
| JP | 2002-339990 A | | | 11/2002 |
| JP | 2003-291604 A | | | 10/2003 |
| JP | 2003-294031 A | | | 10/2003 |
| JP | 2003278747 A | * | | 10/2003 |
| JP | 2004-11799 A | | | 1/2004 |
| JP | 2004011799 A | * | | 1/2004 |
| JP | 2004-144182 A | | | 5/2004 |
| JP | 2004144182 A | * | | 5/2004 |
| JP | 2004150485 A | * | | 5/2004 |

* cited by examiner

VEHICULAR-WHEEL BEARING ASSEMBLY

TECHNICAL FIELD

The present invention relates to a vehicular-wheel bearing assembly.

BACKGROUND ART

A conventionally known vehicular-wheel bearing assembly (hub unit) to which wheels of an automobile are mounted includes an inner shaft to which a wheel and a brake rotor of a disk brake are mounted, and an outer ring that is fitted to the inner shaft from outside via two rows of rolling elements and is secured to a vehicle body. Raceway surfaces for the rolling elements are formed in two areas in an outer peripheral surface of the inner shaft, an outer peripheral surface of an inner ring member fitted to the inner shaft from outside, and an inner peripheral surface of the outer ring.

The outer ring and the inner shaft are made of, for example, carbon steel material such as S55C (carbon steel material for mechanical structure) by hot forging. Further, the raceway surfaces that require high hardness, and a base of a flange portion to which the wheel is mounted in the inner shaft are subjected to heat treatment (high frequency quenching and tempering). This increases performance and life. Such heat treatment, however, is a factor of increasing production costs. Particularly, selective quenching of the inner peripheral surface of the outer ring and the outer peripheral surface of the inner shaft having complicated shapes is difficult and increases production costs.

Thus, for example, as described in Japanese Patent Laid-Open No. 2003-294031, a configuration is proposed in which an inner shaft is formed by cold forging of a tubular material to reduce an area of cutting or polishing, thereby reducing production costs.

Another known vehicular-wheel bearing assembly to which wheels of an automobile are mounted includes an inner shaft having a flange portion to which a wheel side member is mounted, and an outer ring that is fitted to the inner shaft from outside via two rows of rolling elements and is secured to a vehicle body. The wheel side member includes a wheel and a brake rotor of a disk brake.

For example, as described in Japanese Patent Laid-Open No. 2003-291604, a guide member that serves as a guide for mounting a wheel side member to a mounting surface of a flange portion is provided at an end of an inner shaft. The guide member is a separate member from the inner shaft for simplifying the shape of the inner shaft formed by forging, which facilitates production and reduces costs.

DISCLOSURE OF THE INVENTION

The bearing assembly described in Japanese Patent Laid-Open No. 2003-294031 requires heat treatment of a raceway surface and cannot solve the above described problem. The assembly does not consider electric pitting that occurs between the bearing assembly and a counterpart member when the outer ring and the inner shaft are made of carbon steel and the counterpart member secured thereto is made of different material, for example, aluminum. Specifically, when the counterpart member secured to the wheel bearing assembly, for example, a knuckle secured to the outer ring or a wheel secured to the inner shaft is made of aluminum, water entering a gap between the bearing assembly and the counterpart member causes corrosion of aluminum of the counterpart member due to a difference in ionization tendency between iron and aluminum, the counterpart member is deposited on the a vehicular-wheel bearing assembly, making removal of the bearing device difficult. When such deposition occurs, the bearing assembly is removed from the counterpart member by hammering or the like, and this impact damages the bearing assembly.

The guide member of the bearing assembly described in Japanese Patent Laid-Open No. 2003-291604 has a cylindrical guide portion on an outer peripheral side in contact with the mounting surface of the flange portion. When a load is applied to the flange portion in this state, the flange portion is bent, and displacement thereof causes the mounting surface of the flange portion to push the cylindrical guide portion on the outer peripheral side of the guide member. Thus, the guide member is simply fitted in the inner shaft, and may be removed from the inner shaft with long-term use.

The present invention is achieved in view of the above described problems, and has a first object to provide a wheel bearing assembly that can omit partial heat treatment of an inner shaft and an outer ring to reduce production costs, and has a raceway surface with predetermined hardness that is not affected by material of a counterpart member mounted thereto. Further, the wheel bearing assembly is provided that increases a loading capacity for an axial load, and can increase life with a simple configuration.

Further, the present invention is achieved in view of the above described problems, and has a second object to provide a vehicular-wheel bearing assembly that facilitates mounting of a guide member that serves as a guide for mounting a wheel side member, and can reduce production costs and prevent removal of the guide member after long-term use.

In order to achieve the first object, the present invention provides a vehicular-wheel bearing assembly including: an inner shaft; an outer ring provided around the inner shaft; and a rolling element provided between the inner shaft and the outer ring in angular contact with the inner shaft and the outer ring, wherein an annular raceway member with a curved section that is a separate member from the inner shaft and the outer ring and has a raceway surface for the rolling element is provided on at least one of an outer peripheral surface of the inner shaft and an inner peripheral surface of the outer ring.

According to the vehicular-wheel bearing assembly having such configuration, the raceway member is the separate member, thereby allowing the entire raceway member before assembly to be subjected to heat treatment for increasing hardness of the raceway surface. This eliminates the need for partial heat treatment of the inner shaft and the outer ring, thereby reducing production costs and equipment costs. Further, the raceway surface having predetermined hardness can be obtained. The raceway member with a curved section having increased hardness due to heat treatment can be used to increase life, and receive a radial load and an axial load of the vehicular-wheel bearing assembly.

The raceway member that is the separate member is provided to allow use of an outer ring and an inner shaft made of material such as aluminum that cannot be increased in hardness by heat treatment. Further, the outer ring and the inner shaft can be made of materials having high workability, high productivity, and high functionality. For example, an outer ring made of cast aluminum can be connected to an aluminum knuckle that is a vehicle body side member recently used, is high in workability, and allows mass production and reduction in weight of the bearing assembly.

The raceway member is preferably a pressed product formed by pressing a plate (sheet) material so as to have a generally annular shape and a curved section. With this configuration, the raceway member is pressed to have a curved section, and thus the raceway surface has high dimensional accuracy and a good surface condition. Thus, after assembly of the raceway member, dimension adjustment of the raceway surface can be omitted, or dimension adjustment time can be reduced. Smooth rotation can be performed between the outer ring and the inner shaft.

The raceway member is preferably press-fitted in the outer peripheral surface of the inner shaft and the inner peripheral surface of the outer ring. This configuration allows the raceway member to be firmly assembled. Further, the assembly is very simple, thereby reducing production man-hour.

It is preferable that the outer ring is made of the same kind of material as a counterpart member on a vehicle side connected to the outer ring, and the raceway member is provided on the inner peripheral surface of the outer ring. With this configuration, even if the counterpart member on the vehicle side mounted to the outer ring of the vehicular-wheel bearing assembly is made of, for example, aluminum, the outer ring is made of aluminum to prevent electric pitting between the bearing assembly and the counterpart member. This prevents deposition of aluminum on the bearing assembly and avoids inability to remove the bearing assembly.

The inner shaft preferably has, near a position of the raceway member, a flange portion that is formed to extend radially outwards by rocking die forging and to which a wheel side member is mounted. With this configuration, the flange portion can be obtained using a low-capacity press. This can reduce equipment costs and production costs. Specifically, when a cylindrical material is formed by application of an axial compressive force using a press that presses only in a uniaxial direction that is an axial direction thereof, a flange portion needs to be extended in a direction perpendicular to the axial direction, which requires a 2500 to 3000 ton press. However, the rocking die forging in the present invention can gradually extend the flange portion radially outwards, and thus the flange portion can be formed by a small press of the order of 800 tons.

Further, an area subjected to the rocking die forging extending from the outer peripheral surface of the inner shaft to a base of the flange portion may have reduced surface roughness. Thus, the area can be a seal surface of a seal member provided between the outer ring and the inner shaft without cutting or polishing.

In this case, it is preferable that the raceway member is provided on the outer peripheral surface of the inner shaft, and the flange portion is provided near the raceway member provided on the outer peripheral surface of the inner shaft. This configuration eliminates the need for heat treatment at the outer peripheral surface of the inner shaft to be the raceway surface and the base of the flange portion that has been conventionally performed, and reduces equipment costs and production costs. Specifically, in conventional assemblies, the inner shaft is subjected to partial heat treatment for increasing hardness of the raceway surface formed on the outer peripheral surface of the inner shaft to a predetermined value, and the base of the flange portion provided near the raceway surface is also subjected to heat treatment for increasing strength thereof. However, the raceway member that is the separate member from the inner shaft and previously subjected to heat treatment is provided to eliminate the need for partial heat treatment of the outer peripheral surface of the inner shaft, and the need for heat treatment of the base of the flange portion by work hardening due to the rocking die forging.

It is also preferable that the assembly further includes a guide member that is fitted in a hole formed in an end of the inner shaft, axially protrudes beyond the mounting surface of the flange portion for the wheel side member, and serves as a guide for mounting the wheel side member to the flange portion, and the guide member is metal plated with material having a smaller difference in ionization tendency from the metal material of the wheel side member than iron. This configuration can prevent electric pitting due to water entering a gap between the wheel side member mounted to the flange portion and the guide member. For example, when the wheel side member is made of aluminum, and the guide member made of metal containing iron is zinc plated, a difference in ionization tendency from aluminum can be smaller than iron, thereby preventing electric pitting due to water entering the gap between the wheel side member and the guide member.

In order to obtain a structure that increases a loading capacity for an axial load, the present invention provides a vehicular-wheel bearing assembly including: an inner shaft; an outer ring provided around the inner shaft; and a rolling element provided between the inner shaft and the outer ring in angular contact with the inner shaft and the outer ring, wherein an annular raceway member with a curved section that is a separate member from the inner shaft and the outer ring and has a raceway surface for the rolling element is provided on a mounting peripheral surface of at least one of an outer peripheral surface of the inner shaft and an inner peripheral surface of the outer ring, and the mounting peripheral surface has a first straight peripheral surface that is in contact with the raceway member and extends straight in parallel with an axis, and a second straight peripheral surface that is in contact with the raceway member and extends straight in a direction inclined with respect to the axis.

With the vehicular-wheel bearing assembly having such a configuration, the raceway member is the separate member, thereby allowing the entire raceway member before assembly to be subjected to heat treatment for increasing hardness of the raceway surface. This eliminates the need for partial heat treatment of the inner shaft and the outer ring, thereby reducing production costs and equipment costs. Further, the raceway surface having predetermined hardness can be obtained. The raceway member with a curved section can be brought into surface contact with the first straight peripheral surface and the second straight peripheral surface of the mounting peripheral surface. Thus, a radial load applied and an axial load can be reliably transmitted to the inner shaft and the outer ring via the first straight peripheral surface and the second straight peripheral surface, respectively. Further, the first straight peripheral surface and the second straight peripheral surface can receive a load in a direction of a contact angle. Also, contact surface pressure can be reduced.

The raceway member preferably has a third straight peripheral surface that is in surface contact with the first straight peripheral surface and extends straight in parallel with the axis, and a fourth straight peripheral surface that is in surface contact with the second straight peripheral surface and extends straight in a direction inclined with respect to the axis. With this configuration, the raceway member can be reliably brought into surface contact with the inner shaft and the outer ring to transmit the loads. In mounting the raceway member to the mounting peripheral surface, positioning of the raceway member is facilitated to reduce production man-hour, and high dimensional accuracy in assembly and stable quality can be obtained. Further, application of the loads does not cause displacement of the raceway member.

An inclination angle of the second straight peripheral surface with respect to the first straight peripheral surface in a longitudinal section is preferably 30° or larger and 80° or smaller. With this configuration, the axial load can be reliably received. Further, the load in the direction of the contact angle generally of the order of 40° can be reliably received. Specifically, the inclination angle smaller than 30° reduces a loading capacity for the axial load, and the inclination angle larger than 80° increases a gap between a portion between the first and second straight peripheral surfaces and the raceway member to reduce the area of a contact portion with the raceway member.

It is preferable that the raceway member is a pressed product formed by pressing a plate material so as to have a generally annular shape and a curved section, and the raceway member has a thickness of 1.5 mm or larger and 4 mm or smaller. This configuration provides high workability with a press and sufficient strength. Specifically, a thickness of larger than 4 mm requires a large capacity press, reducing workability. A thickness of smaller than 1.5 mm causes insufficient strength, which may reduce life.

The present invention further provides a vehicular-wheel bearing assembly including: an inner shaft; an outer ring provided around the inner shaft; and a rolling element provided between the inner shaft and the outer ring in angular contact with the inner shaft and the outer ring, wherein an annular raceway member with a curved section that is a separate member from the inner shaft and the outer ring and has a raceway surface for the rolling element is provided on at least one of an outer peripheral surface of the inner shaft and an inner peripheral surface of the outer ring, and an irregular surface portion for preventing rotation is formed on a peripheral surface of the raceway member.

According to the vehicular-wheel bearing assembly having such a configuration, the raceway member is the separate member, thereby allowing the entire raceway member before assembly to be subjected to heat treatment for increasing hardness of the raceway surface. This eliminates the need for partial heat treatment of the inner shaft and the outer ring, thereby reducing production costs and equipment costs. Further, the raceway surface having predetermined hardness can be obtained.

Further, even if a large load is applied to the raceway member provided as the separate member on the inner shaft and the outer ring, the irregular surface portion prevents circumferential movement of the raceway member, thereby allowing the raceway member to be firmly mounted. Rotation can be reliably prevented with a simple configuration. Further, the raceway member can be easily mounted, thereby reducing production man-hour. The raceway member having a curved section can be used to receive a radial load applied and an axial load.

It is preferable that the raceway member has a first circumferential portion that receives a radial load, and a second circumferential portion that is provided on a base end side of the first circumferential portion and receives an axial load, and the irregular surface portion is formed on a peripheral surface of the first circumferential portion. With this configuration, the raceway member can be mounted so that protrusions of the irregular surface portion engage the outer peripheral surface of the inner shaft and the inner peripheral surface of the outer ring. Thus, a synergistic effect between a radial resilient force of the first circumferential portion that fits the inner shaft and the outer ring and a rotation preventing action due to an increase in resistance in the irregular surface portion formed on the peripheral surface of the first circumferential portion allows more effective rotation prevention.

It is preferable that the rolling element constituted by a ball is provided on a raceway surface side of the raceway member, and the irregular surface portion is formed in an area closer to a tip of the first circumferential portion than a surface perpendicular to an axis passing through the center of the ball, on the peripheral surface of the first circumferential portion of the raceway member. With this configuration, the irregular surface portion and a raceway contact portion of the ball in the direction of the contact angle are axially spaced apart, and thus press-fitting at the irregular surface portion does not cause distortion in a raceway contact portion of the raceway member. Specifically, even if some distortion that occurs at the tip of the first circumferential portion of the raceway member on which the irregular surface portion is formed, some distortion does not reduce accuracy of the raceway surface of the raceway member, and does not affect tolerances for rolling bearing and bearing life.

In order to achieve the second object, the present invention provides a vehicular-wheel bearing assembly including: an outer ring; an inner shaft provided in the outer ring rotatably via rolling element; a flange portion provided on any one of the inner shaft and the outer ring and to which a wheel side member is mounted; and a guide member that is fitted as a separate member in a hole formed in an end of the inner shaft or the outer ring, protrudes beyond a mounting surface of the flange portion for the wheel side member, and serves as a guide for mounting the wheel side member to the flange portion, wherein the guide member has a fitting portion fitted in the hole, an annular flat portion extending radially outwards from the fitting portion, and a cylindrical portion extending in a bent manner from an outer peripheral edge of the annular flat portion in parallel with an axis, and the annular flat portion and the flange portion do not come into contact with each other with a gap formed therebetween.

According to the vehicular-wheel bearing assembly having such a configuration, the guide member is the separate member from the inner shaft or the outer ring having the flange portion, and thus application of a load to the flange portion does not cause local stress concentration at the flange portion. Specifically, if a cylindrical guide portion protruding beyond a mounting surface on a base side of a flange portion is formed integrally with the flange portion, a section of the flange portion is sharply increased at the base to restrain deformation of the flange portion, and thus application of a load causes stress concentration at the base of the flange portion.

However, the guide member is the separate member from the flange portion, and thus deformation of the flange portion is not restrained by the guide member, and can be freely elastically deformed according to a load applied, thereby causing no stress concentration.

Further, the guide member can be mounted by press-fitting in the end of the inner shaft or the outer ring, and thus can be easily mounted to reduce production man-hour. Even if the load is applied to cause the flange portion to be bent and deformed, the mounting surface of the flange portion and the annular flat portion of the guide member do not come into contact with each other, and thus the guide member simply press-fitted in the inner shaft or the outer ring is not pushed out by the deformation of the flange portion, thereby preventing removal of the guide member.

The value of the gap is preferably the sum of an axial displacement amount by deflection of the flange portion due to application of a load, and a margin dimension. With this configuration, even if the flange portion is deformed by a supposed axial displacement amount of the flange portion, a gap of the margin dimension can remain.

BEST MODE FOR CARRYING OUT THE INVENTION

Now, an embodiment of the present invention will be described in detail with reference to the accompanying drawings.

Figure 1:
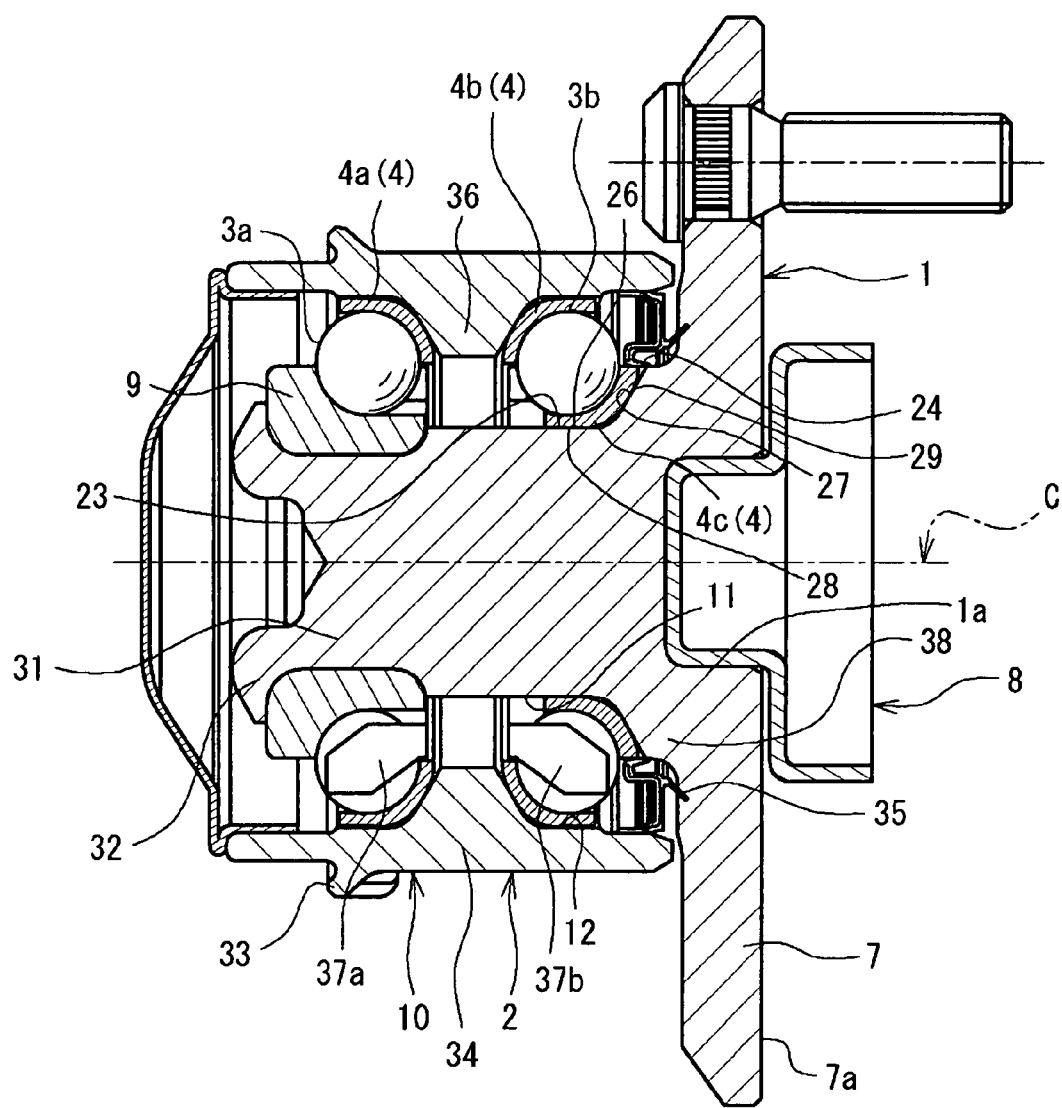
FIG. 1 is a drawing of longitudinal section of a vehicular-wheel bearing assembly according to an embodiment of the present invention.

FIG. 1 is a drawing of longitudinal section of a vehicular-wheel bearing assembly according to an embodiment of the present invention. The vehicular-wheel bearing assembly includes an inner shaft (hub wheel) 1, an outer ring 2 provided around the inner shaft 1, and two rows of balls 3a and 3b as rolling elements rollably provided between the inner shaft 1 and the outer ring 2 in angular contact with the inner shaft 1 and the outer ring 2. The two rows of balls 3a and 3b are in contact with the inner shaft 1 and the outer ring 2 at a predetermined contact angle θ (see FIG. 3), and the vehicular-wheel bearing assembly includes a double row angular contact ball bearing 10.

In the vehicular-wheel bearing assembly of the present invention, an annular raceway member 4 that is a separate member from the inner shaft 1 and the outer ring 2 and has a raceway surface for the rolling element is provided on a mounting peripheral surface of at least one of an outer peripheral surface 11 of the inner shaft 1 and an inner peripheral surface 12 of the outer ring 2, in order to configure raceway surfaces for the balls 3a and 3b. In the embodiment in FIG. 1, the inner peripheral surface 12 of the outer ring 2 and the outer peripheral surface 11 of the inner shaft 1 are mounting peripheral surfaces, and two raceway members 4a and 4b are provided on the inner peripheral surface 12 of the outer ring 2, and one raceway member 4c is provided on the outer peripheral surface 11 of the inner shaft 1.

In FIG. 1, the inner shaft 1 has a shaft portion 31 having a circular section and extending longitudinally along an axis C of the bearing assembly, and a flange portion 7 formed at one end on an outer peripheral side of the shaft portion 31, extending radially outwards, and to which an unshown wheel and a brake rotor are mounted. As shown in a sectional view of essential portions in FIG. 3, an inner ring member 9 having a first inner ring raceway that is a single raceway is fitted from outside to a small diameter outer peripheral surface 22 closer to the other end of the shaft portion 31 of the inner shaft 1. The raceway member 4c is fitted from outside to a middle diameter outer peripheral surface 23 in midstream in an axial direction of the shaft portion 31, and an outer peripheral surface of the raceway member 4c is a single second inner ring raceway. Thus, a large diameter outer peripheral surface 24 closer to one end of the shaft portion 31 and a base of the flange portion 7 are seal surfaces of a seal member 35 provided between the inner shaft 1 and the outer ring 2. At the other end of the shaft portion 31, an outer peripheral end is extended radially outwards to form a caulking portion 32, and the caulking portion 32 retains and secures the inner ring member 9 to the shaft portion 31.

As the inner ring member 9 fitted from outside to the inner shaft 1, an inner ring used in a conventionally known angular contact ball bearing may be used, and the inner ring member 9 may be made of material conventionally used, for example, stainless steel.

In FIG. 1, the outer ring 2 has a cylindrical portion 34 coaxial with the inner shaft 1, and a flange portion 33 formed radially outwards on an outer periphery of the cylindrical portion 34. The vehicular-wheel bearing assembly is secured to an unshown vehicle body via the flange portion 33.

The first and second raceway members 4a and 4b that form the first and second outer ring raceways are provided on the inner peripheral surface 12 of the cylindrical portion 34 of the outer ring 2. The raceway members 4a and 4b are provided axially via an axial load receiving thick portion 36 formed on the inner peripheral surface 12 of the outer ring 2. The two rows of balls 3a and 3b and two crown type cages 37a and 37b are provided between the raceway members 4a and 4b provided on the outer ring 2 and the inner ring member 9 and the raceway member 4c provided on the inner shaft 1.

The outer ring 2 having the inner peripheral surface 12 on which the raceway members 4a and 4b are provided is made of the same kind of material as a counterpart member on a vehicle side connected to the outer ring 2. For example, when a mounting portion of a counterpart member on a vehicle body is made of aluminum, the outer ring 2 is also made of aluminum. This prevents water entering a gap between the bearing assembly and the counterpart member from causing electric pitting therebetween. Further, the outer ring 2 may be made of cast aluminum to increase productivity. Specifically, the raceway members 4a and 4b can be mounted to the outer ring 2 made of cast aluminum and having the inner peripheral surface 12 that is not subjected to finishing such as cutting or polishing for forming the raceway surface. This can reduce machining costs, simplify production facilities, and increase productivity.

The inner shaft 1 may be also made of the same kind of material as a counterpart member mounted thereto, and may be made of aluminum. As shown in FIG. 1, the raceway member 4c that is the separate member is provided on the outer peripheral surface of the inner shaft 1. Thus, the inner shaft 1 and the outer ring 2 are made of aluminum to allow reduction in weight of the bearing assembly.

The outer ring 2 and the inner shaft 1 are made of the same kind of material as the counterpart members mounted thereto, and the word "the same kind" includes the case of the same material or components, and the case of the same (substantially the same) ionization tendency with different material or components. Specifically, in the present invention, the inner shaft 1 and the outer ring 2 can be made of material such as aluminum that cannot be increased in hardness by heat treatment. Further, the inner shaft 1 and the outer ring 2 can be made of materials having high workability, high productivity, and high functionality.

The raceway members 4a, 4b and 4c (hereinafter also collectively referred to as raceway members 4) are pressed products formed by pressing a plate material so as to have a generally annular shape and a curved section. The raceway members 4 may be made of a carbon steel sheet, for example, SK5 or S75CM that can be pressed and subjected to heat treatment (quenching and tempering). The raceway members 4a and 4b pressed into a predetermined shape and subjected to heat treatment are press-fitted in the inner peripheral surface 12 of the outer ring 2. The raceway member 4c is provided on the outer peripheral surface 11 of the inner shaft 1 so that the inner shaft 1 is press-fitted in the raceway member 4c subjected to heat treatment. This allows the raceway members 4 to be firmly assembled, and can facilitate the assembly and reduce production man-hour.

The raceway members 4a and 4b provided on the inner peripheral surface 12 of the outer ring 2 have recessed raceway surfaces on the inner peripheral surfaces thereof, and the raceway member 4c provided on the outer peripheral surface 11 of the inner shaft 1 has a recessed raceway surface on the outer peripheral surface thereof. The rolling elements constituted by the balls 3a and 3b are provided on the side of the raceway surfaces of the raceway members 4.

The raceway members 4 are mounted by press-fitting so that the raceway members 4 maintain, even after mounting, their shapes after pressing. Specifically, the shapes of the raceway members 4 after assembly to the inner shaft 1 and the outer ring 2 are substantially the same as the shapes of the raceway members 4 after pressing and before assembly.

Figure 3:
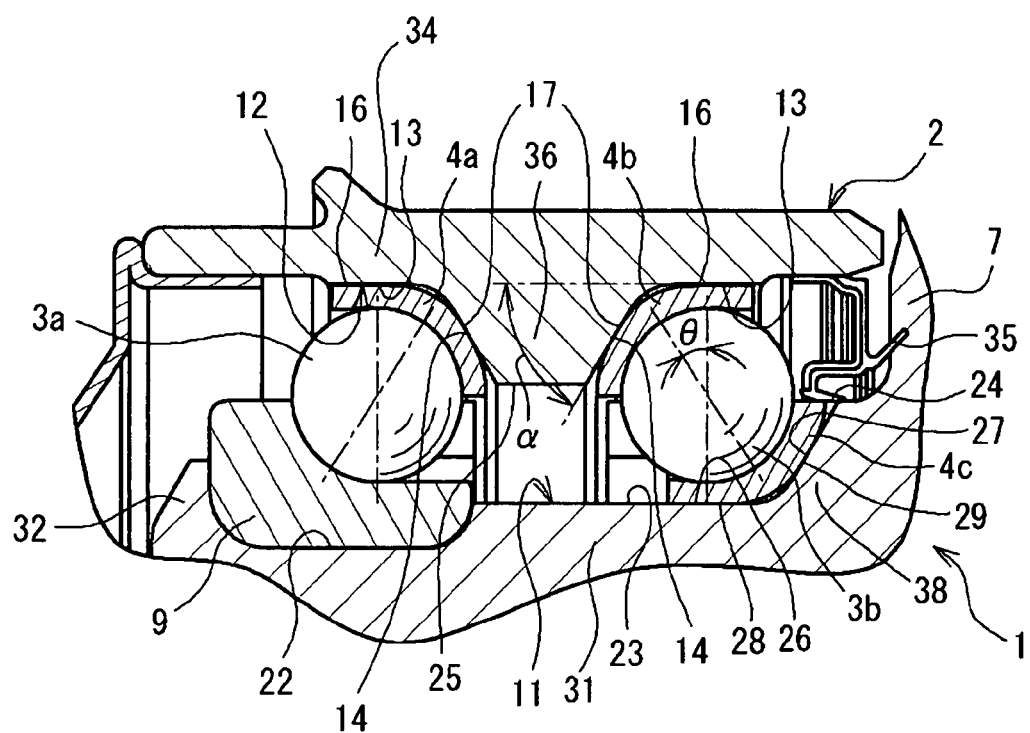
FIG. 3 is a sectional view of essential portions of the vehicular-wheel bearing assembly in FIG. 1.

As shown in FIGS. 1 and 3, in the outer peripheral surface 11 of the inner shaft 1, the flange portion 7 to which a wheel side member is mounted is formed near the position of the third raceway member 4c. The flange portion 7 is preferably formed as described below. Material having a circular section to be the inner shaft is formed not by application of an axial compressive force using a press that operates only in a uniaxial direction that is an axial direction thereof, but by hot rocking die forging of one end of the material to be the inner shaft 1 using an rocking calking tool (not shown) to gradually extend the end radially outwards from the cylindrical shape. The rocking die forging can eliminate heat treatment of the base of the flange portion 7 by work hardening. Further, a surface of an area subjected to the rocking die forging extending from the large diameter outer peripheral surface 24 of the shaft portion 31 to the base of the flange portion 7 are smoothed with high accuracy, and thus the area can be a good seal surface of the seal member 35 without secondary machining such as cutting or polishing or with reduced time for secondary machining.

The shape of the inner peripheral surface 12 of the cylindrical portion 34 of the outer ring 2 to which the raceway members 4a and 4b are mounted by press-fitting will be described with reference to FIG. 3. The axial load receiving thick portion 36 raised radially inwards is formed in the axial middle of the inner peripheral surface 12. The receiving thick portion 36 has a trapezoidal section having an axial width gradually decreasing inwards. On opening end sides of the receiving thick portion 36, straight inner peripheral surfaces are formed that are continuous with radially outward of the receiving thick portion 36 and extend straight in parallel with the axis C. The raceway members 4a and 4b are mounted by press-fitting in opposite sides of the receiving thick portion 36 from opposite opening ends of the cylindrical portion 34 of the outer ring 2.

Specifically, the inner peripheral surface 12 of the outer ring 2 is the mounting peripheral surface of the raceway members 4a and 4b, and the inner peripheral surface 12 of the outer ring 2 has, at each axial side, a first straight inner peripheral surface 13 parallel to the axis C, and a second straight inner peripheral surface 14 inclined with respect to the axis C. The first straight inner peripheral surface 13 is a cylindrical inner peripheral surface that extends straight in parallel with the axis C of the bearing assembly and has a uniform cross sectional shape along the axis C. The second straight inner peripheral surface 14 is formed closer to the axial middle of the outer ring 2 than the first straight inner peripheral surface 13, and is an inclined inner peripheral surface that extends straight in a direction inclined with respect to the axis C at a certain inclination angle. The first straight inner peripheral surface 13 and the second straight inner peripheral surface 14 are continuous via an arcuate portion. The first straight inner peripheral surface 13 and the second straight inner peripheral surface 14 continuous therewith on one of the right and left, and the surfaces 13 and 14 on the other in FIG. 3 are symmetric with respect to a phantom center line of the receiving thick portion 36 in a longitudinal section perpendicular to the axis. Right and left peripheral surfaces of the receiving thick portion 36 having the trapezoidal section are the second straight inner peripheral surfaces 14 and 14, and an innermost peripheral surface 25 of the receiving thick portion 36 having the trapezoidal section is formed between the right and left second straight inner peripheral surfaces 14 and 14. The innermost peripheral surface 25 is parallel to the first straight inner peripheral surfaces 13 and 13.

The annular raceway members 4a and 4b having curved sections are fitted in the inner peripheral surface 12 of the outer ring 2 in contact with the first straight inner peripheral surface 13 and the second straight inner peripheral surface 14, respectively. The raceway members 4a and 4b each are provided with a slight gap between an arcuate portion between the first straight inner peripheral surface 13 and the second straight inner peripheral surface 14 and a middle portion of the outer peripheral surface of each raceway member 4. This allows the outer peripheral surface of each of the raceway members 4a and 4b to be reliably brought into contact with the first straight inner peripheral surface 13 and the second straight inner peripheral surface 14 when the raceway members 4a and 4b are press-fitted.

The raceway members 4a and 4b press-fitted in the inner peripheral surface 12 of the outer ring 2 each have a third straight outer peripheral surface 16 and a fourth straight outer peripheral surface 17 formed by pressing in the outer peripheral surfaces. The third straight outer peripheral surface 16 is in surface contact with the first straight inner peripheral surface 13 of the outer ring 2 and extends straight in parallel with the axis C. The fourth straight outer peripheral surface 17 is in surface contact with the second straight inner peripheral surface 14 of the outer ring 2 and extends straight in a direction inclined with respect to the axis C. The inner peripheral surfaces of the raceway members 4a and 4b are recessed by pressing to have arcuate shape to form the raceway surfaces for the balls 3a and 3b.

As shown in FIG. 3, an inclination angle $\alpha$ between the second straight inner peripheral surface 14 and the first straight inner peripheral surface 13 in the longitudinal section of the outer ring 2 is 30° or larger and 80° or smaller. The inclination angle $\alpha$ of 30° or larger can increase a loading capacity for an axial load. Further, the inclination angle $\alpha$ of 80° or smaller prevents an increase in the gap between the arcuate portion between the first straight inner peripheral surface 13 and the second straight inner peripheral surface 14 and the outer peripheral surface of each of the raceway members 4a and 4b. This allows the third straight outer peripheral surface 16 and the fourth straight outer peripheral surface 17 to be reliably brought into contact with the first straight inner peripheral surface 13 and the second straight inner peripheral surface 14 of the outer ring 2 in each of the raceway members 4a and 4b. Further, a load in a direction of a contact angle θ generally of the order of 40° can be reliably received.

In FIG. 3, the outer peripheral surface 11 of the inner shaft 1 is also a mounting peripheral surface of the third raceway member 4c. Also in providing the raceway member 4c, the raceway member 4c may be provided on the outer peripheral surface 11 of the inner shaft 1 so as to be brought into contact with a first straight outer peripheral surface 26 that is formed on the outer peripheral surface 11 of the inner shaft 1 and extends straight in parallel with the axis C, and a second straight outer peripheral surface 27 that extends straight in a direction inclined with respect to the axis C at a certain angle.

The first straight outer peripheral surface 26 of the inner shaft 1 is formed in part of the middle diameter outer peripheral surface 23, and the second straight outer peripheral surface 27 is formed in an inclined peripheral surface of a second axial load receiving thick portion 38 stepped from the middle diameter outer peripheral surface 23 to the large diameter outer peripheral surface 24. An inclination angle between the first straight outer peripheral surface 26 and the second straight outer peripheral surface 27 is 30° or larger and 80° or smaller. The second axial load receiving thick portion 38 is formed to be raised radially outwards at one end of the outer peripheral surface 11 of the inner shaft 1, and have an axial width gradually decreasing radially outwards. The third raceway member 4c has a third straight inner peripheral surface 28 in surface contact with the first straight outer peripheral surface 26, and a fourth straight inner peripheral surface 29 in surface contact with the second straight outer peripheral surface 27.

Specifically, in the present invention, the raceway member 4 that is the separate member from the inner shaft 1 and the outer ring 2 is provided on the mounting peripheral surface of at least one of the outer peripheral surface 11 of the inner shaft 1 and the inner peripheral surface 12 of the outer ring 2, and the mounting peripheral surface has the first straight peripheral surface that is in contact with the raceway member 4 and extends straight in parallel with the axis, and the second straight peripheral surface that is in contact with the raceway member and extends straight in the direction inclined with respect to the axis. Thus, the raceway member 4 with the curved section can be brought into surface contact with the first straight peripheral surface and the second straight peripheral surface of the mounting peripheral surface. Thus, a radial load applied and an axial load can be reliably transmitted to the inner shaft 1 and the outer ring 2 via the first straight peripheral surface and the second straight peripheral surface, respectively. Further, the first straight peripheral surface and the second straight peripheral surface can receive the load in the direction of the contact angle. Also, contact surface pressure can be reduced.

Further, the raceway member 4 has the third straight peripheral surface that is in surface contact with the first straight peripheral surface of the inner shaft 1 or the outer ring 2 and extends straight in parallel with the axis, and a fourth straight peripheral surface that is in surface contact with the second straight peripheral surface of the inner shaft 1 or the outer ring 2 and extends straight in a direction inclined with respect to the axis. With this configuration, the raceway member 4 can be reliably brought into surface contact with the inner shaft 1 and the outer ring 2 to transmit the loads. In mounting the raceway member 4 to the mounting peripheral surface, positioning of the raceway member 4 is facilitated to reduce production man-hour, and high dimensional accuracy in assembly and stable quality can be obtained. Further, application of the loads does not cause displacement of the raceway member.

The raceway member 4 has a thickness of 1.5 mm or larger and 4 mm or smaller. This thickness is obtained after pressing, and in the entire width along an arc of the section, a minimum thickness is 1.5 mm or larger and a maximum thickness is 4 mm or smaller. This allows the raceway member 4 to be formed using a small capacity press. Further, the raceway surface portion of the raceway member 4 has a thickness of the order of ten times the depth of maximum shear stress, and thus the raceway member 4 has sufficient strength. The raceway member 4 previously subjected to heat treatment and having increased hardness can be used to increase life. Further, the raceway member 4 is pressed to have the curved section, and thus the raceway surface has high dimensional accuracy and a good surface condition. Thus, after assembly of the raceway member 4, dimension adjustment of the raceway surface can be omitted, or dimension adjustment time can be reduced.

Figure 2:
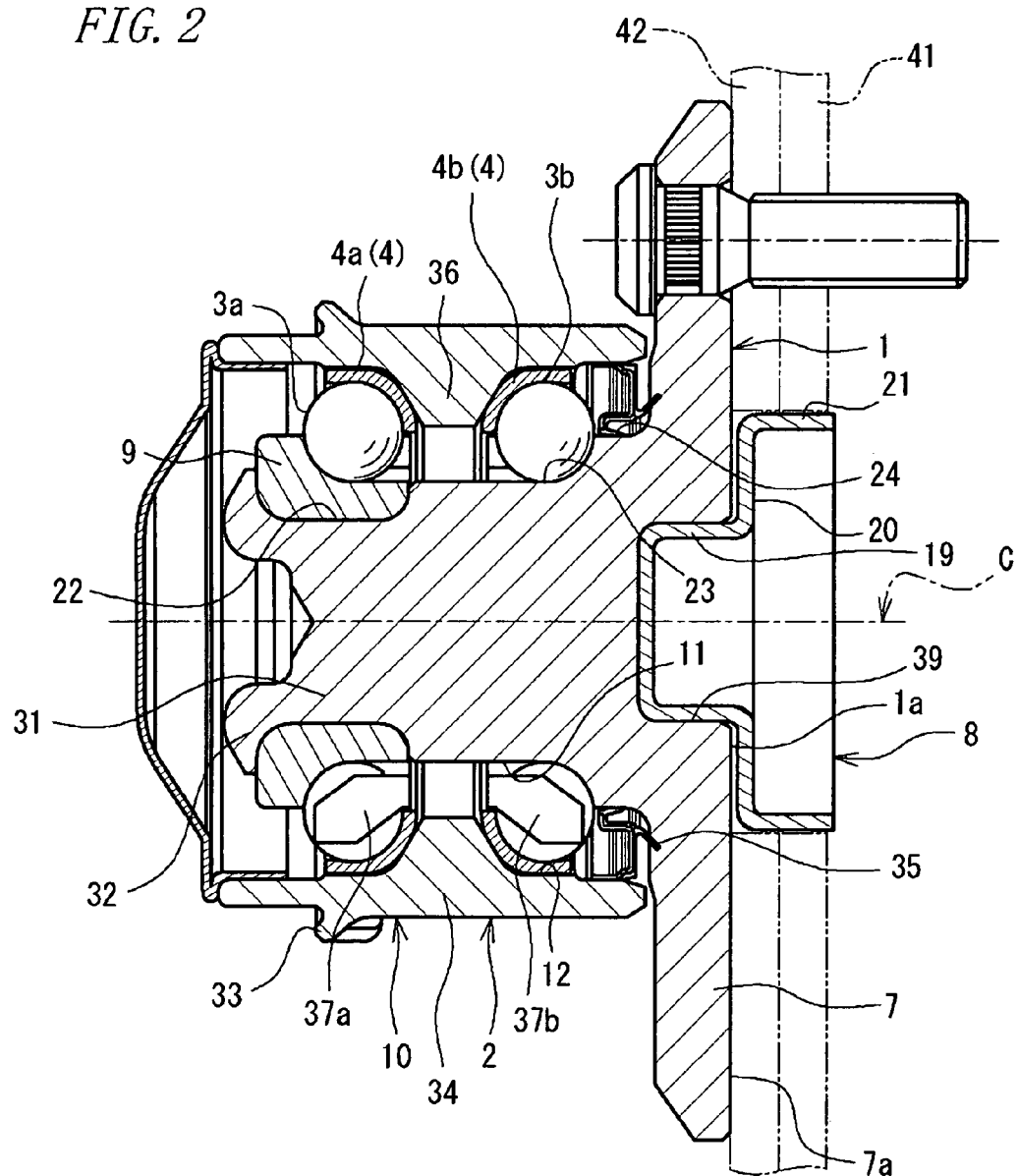
FIG. 2 is a drawing of longitudinal section of a vehicular-wheel bearing assembly according to another embodiment of the present invention.

FIG. 2 is a drawing of longitudinal section of a vehicular-wheel bearing assembly according to another embodiment of the present invention. In FIG. 2, the third raceway member 4c fitted from outside to the outer peripheral surface 11 of the inner shaft 1 in FIG. 1 is omitted, and a single second inner ring raceway is directly formed on a middle diameter outer peripheral surface 23 of a shaft portion 31. Other configurations are the same as those in FIG. 1.

Figure 4:
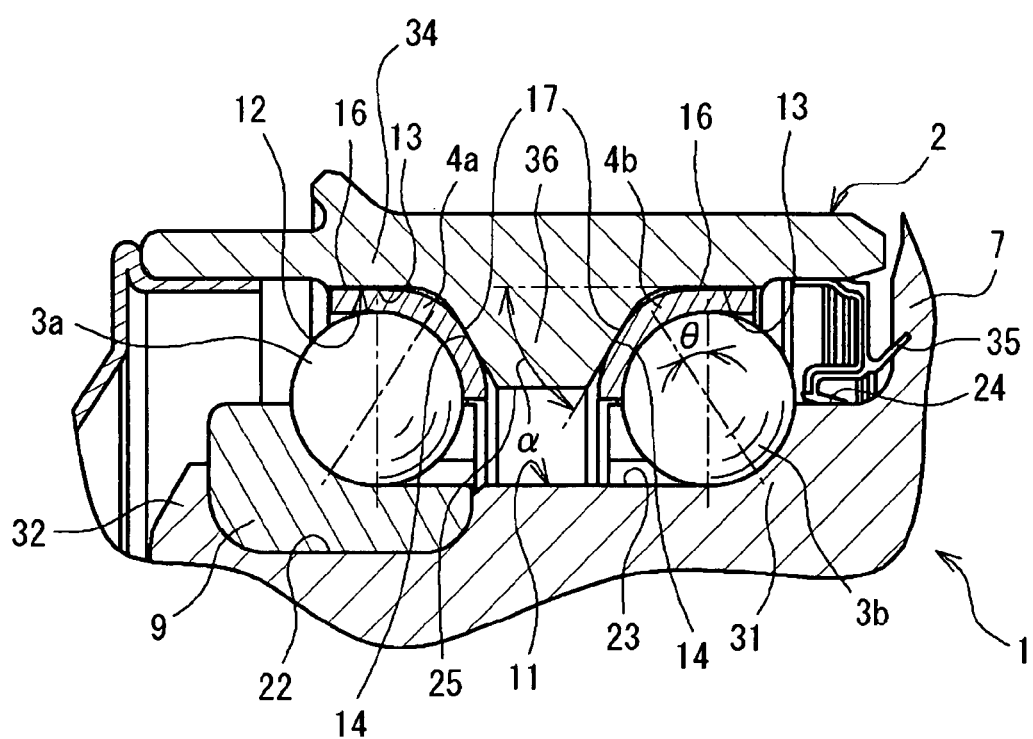
FIG. 4 is a sectional view of essential portions of the vehicular-wheel bearing assembly in FIG. 2.

Specifically, in the embodiment in FIG. 2, an inner peripheral surface 12 of an outer ring 2 is a mounting peripheral surface, and two raceway members 4a and 4b are provided only on the inner peripheral surface 12 of the outer ring 2. As shown in a sectional view of essential portions in FIG. 4, an inner ring member 9 having a first inner ring raceway that is a single raceway is fitted from outside to a small diameter outer peripheral surface 22 closer to the other end of the shaft portion 31 of the inner shaft 1, and the single second inner ring raceway is formed on the middle diameter outer peripheral surface 23 in midstream in an axial direction of the shaft portion 31.

The first and second raceway members 4a and 4b that form the first and second outer ring raceways are provided on the inner peripheral surface 12 of the cylindrical portion 34 of the outer ring 2, axially via an axial load receiving thick portion 36 of the outer ring 2. The two rows of balls 3a and 3b and two crown type cages 37a and 37b are provided between the raceway members 4a and 4b provided on the outer ring 2 and the first and second inner ring raceways on the inner shaft 1.

Figure 5:
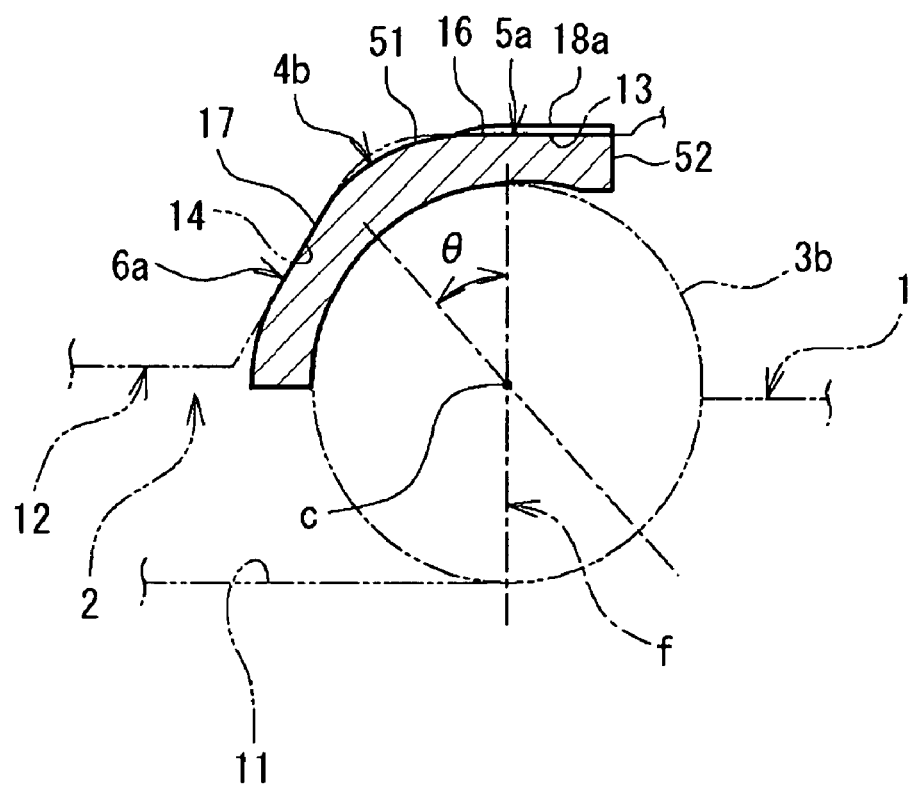
FIG. 5 illustrates a raceway member in the vehicular-wheel bearing assembly in FIG. 2.

FIG. 5 illustrates the second raceway member 4b of the vehicular-wheel bearing assembly in FIG. 2, and the raceway member 4b (4a) on the outer ring 2 has a first circumferential portion 5a that receives a radial load, and a second circumferential portion 6a that is provided radially inwards from a base end 51 of the first circumferential portion 5a and can receive an axial load.

Figure 6:
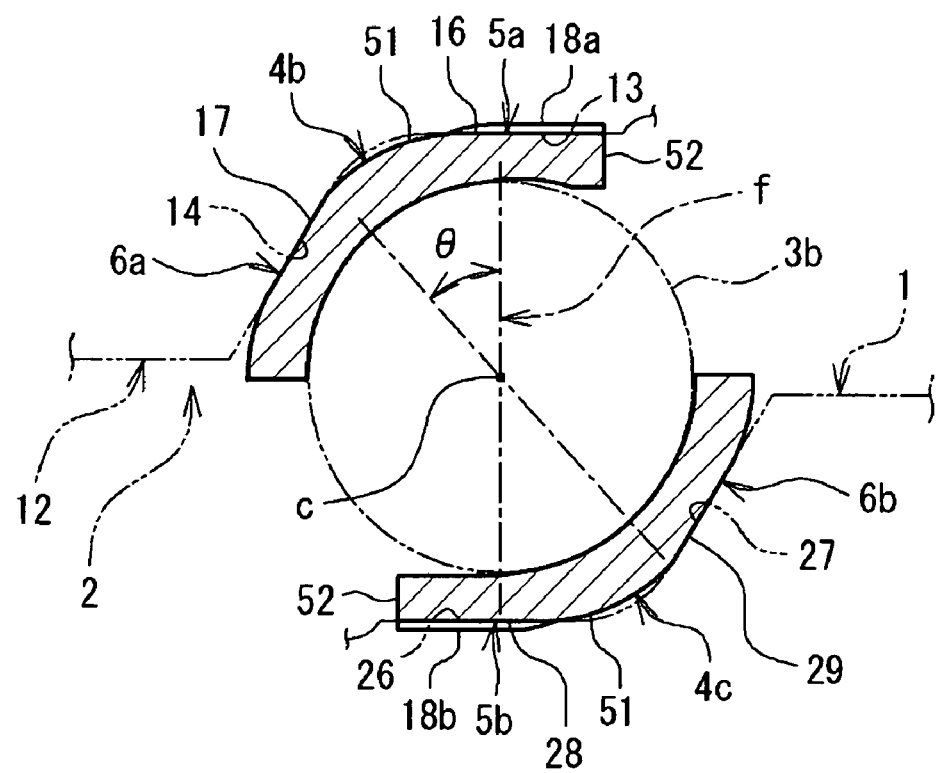
FIG. 6 illustrates a raceway member in the vehicular-wheel bearing assembly in FIG. 1.

FIG. 6 illustrates the raceway members 4b and 4c of the vehicular-wheel bearing assembly in FIG. 1. The raceway member 4b (4a) on the outer ring 2 is the same as that in FIG. 5, and a description thereof will be omitted. In FIG. 6, the raceway member 4c on the inner shaft 1 has a first circumferential portion 5b that receives a radial load, and a second circumferential portion 6b that is provided radially outwards from the base end 51 of the first circumferential portion 5b and can receive an axial load.

In FIG. 5, the raceway member 4b is provided on the inner peripheral surface 12 of the outer ring 2 so as to be prevented from rotation by an irregular surface portion 18a formed on an outer peripheral surface of the raceway member 4b. The irregular surface portion 18a is formed on an outer peripheral surface of the first circumferential portion 5a of the raceway member 4b. The first raceway member 4a is also prevented from rotation by an irregular surface portion 18a and secured.

In FIG. 6, the raceway member 4b on the outer ring 2 is provided as in FIG. 5, and further, the raceway member 4c is prevented from rotation by the irregular surface portion 18b formed on the inner peripheral surface of the raceway member 4c, and provided on the outer peripheral surface 11 of the inner shaft 1. The irregular surface portion 18b is formed on an inner peripheral surface of the first circumferential portion 5b of the raceway member 4c.

The raceway member 4 is preferably press-fitted in the inner shaft 1 and the outer ring 2, and thus can be more firmly assembled.

Thus, the raceway member 4b is mounted to the outer ring 2 so that protrusions of the irregular surface portion 18a engage the inner peripheral surface 12 of the outer ring 2, and a synergistic effect between a radial resilient force of the first circumferential portion 5a that fits the outer ring 2 and a rotation preventing action due to an increase in resistance in the irregular surface portion 18a formed on the peripheral surface of the first circumferential portion 5a allows more effective rotation prevention. The raceway member 4c on the inner shaft 1 can be also effectively prevented from rotation.

Figure 8:
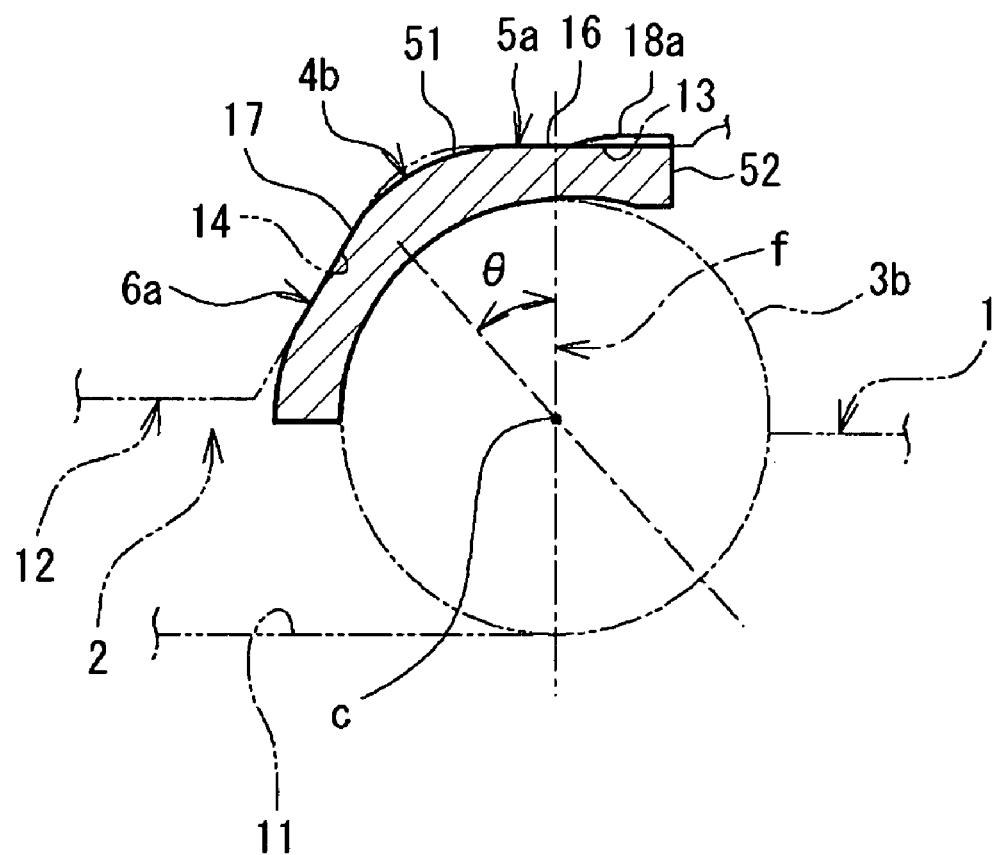
FIG. 8 illustrates a variation of the raceway member.

FIG. 8 illustrates a variation of the raceway member 4b provided on the outer ring 2 (a variation of FIG. 5), and an irregular surface portion 18a is partially formed in an area closer to a tip 52 of a first circumferential portion 5a than a surface f perpendicular to an axis passing through the center c of a ball 3b in an outer peripheral surface of the first circumferential portion 5a.

Figure 9:
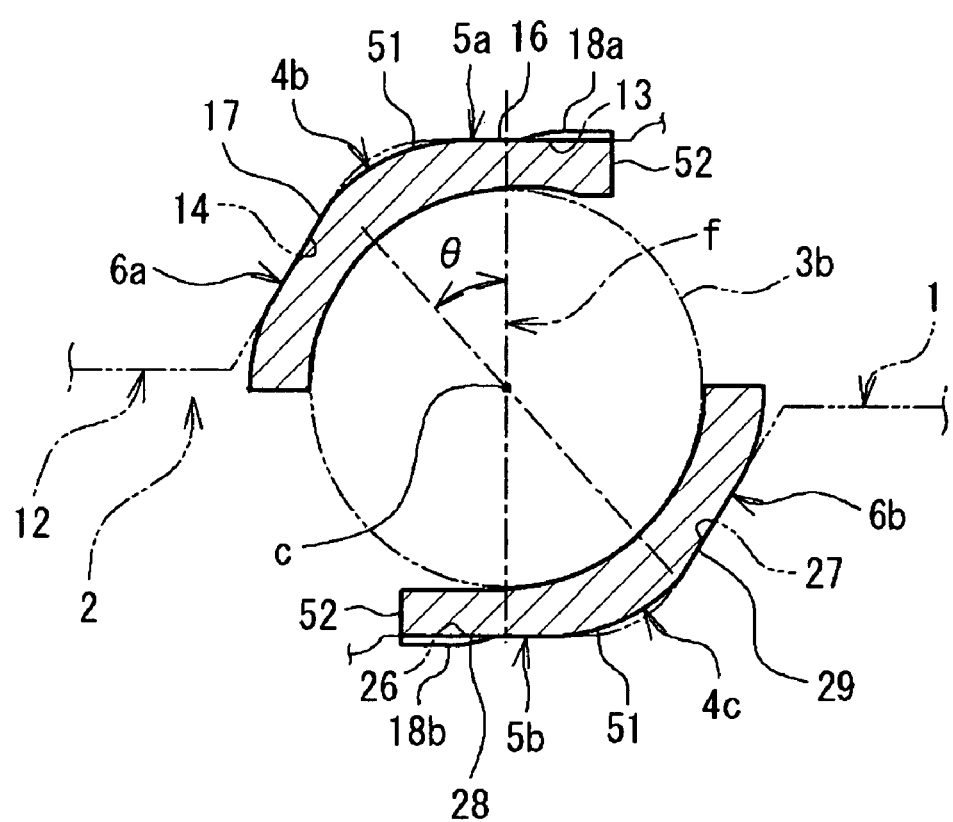
FIG. 9 illustrates a variation of the raceway member.

Further, FIG. 9 illustrates a variation of the raceway member 4c on the inner shaft 1 (a variation in FIG. 6), and an irregular surface portion 18b is partially formed in an area closer to a tip 52 of a first circumferential portion 5b than a surface f perpendicular to an axis passing through the center c of a ball 3b in an inner peripheral surface of the first circumferential portion 5b. Specifically, in the raceway members 4 in FIGS. 8 and 9, distortion of the raceway members 4 due to press-fitting at the irregular surface portions 18a and 18b occurs only at the tips 52 of the first circumferential portions 5a and 5b. This reduces the influence of press-fitting on raceway surfaces formed on base ends 51. Specifically, the irregular surface portions 18a and 18b and raceway contact portions of the ball 3b in a direction of a contact angle are axially spaced apart. This reduces the influence of deformation due to press-fitting on the raceway surfaces formed on the base ends 51. This prevents deformation of the contact portions of the balls 3a and 3b with the raceway surfaces.

Figure 7:
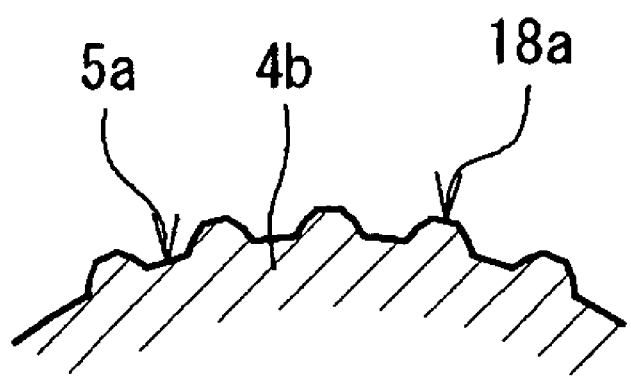
FIG. 7 is a drawing of cross section of essential portions of the raceway member.

The irregular surface portions 18a and 18b may have serration shapes, and as shown in a drawing of cross section of essential portions of the raceway member 4b in FIG. 7, the irregular surface portion 18a has an irregular corrugated shape continuously circumferentially formed in the outer peripheral surface of the raceway member 4b. The irregular surface portion 18a is preferably formed over the entire circumference so that the raceway member 4b is circumferentially uniformly fitted therein. The irregular section may have an angular shape.

The raceway members 4 are mounted to the outer ring 2 and the inner shaft 1 by press-fitting at the irregular surface portions 18a and 18b so that the raceway members 4 maintain, even after mounting, their shapes after pressing. Specifically, the shapes of the raceway members 4 after assembly to the inner shaft 1 and the outer ring 2 are substantially the same as the shapes of the raceway members 4 after pressing and before assembly.

The irregular surface portions 18a and 18b may be simultaneously formed when the raceway members 4 are formed by a press. Alternatively, the irregular surface portions 18a and 18b may be formed by cutting after pressing.

In FIG. 3, the axial load receiving thick portion 36 raised radially inwards is formed in the axial middle of the inner peripheral surface 12. The receiving thick portion 36 has a trapezoidal section having an axial width gradually decreasing inwards. Opposite peripheral surfaces of the receiving thick portion 36 are the second straight inner peripheral surfaces 14 and 14 extending straight in a direction inclined with respect to the axis C. On opening end sides of the receiving thick portion 36, the first straight inner peripheral surfaces 13 and 13 are formed that are continuous with radially outward of the receiving thick portion 36 and extend straight in parallel with the axis C. The first straight inner peripheral surface 13 and the second straight inner peripheral surface 14 are continuous via an arcuate portion.

The raceway members 4a and 4b are press-fitted in opposite sides of the receiving thick portion 36 from opposite opening ends of the cylindrical portion 34 of the outer ring 2, and as shown in FIGS. 5 and 8, the outer peripheral surface of the first circumferential portion 5a of the raceway member 4b (4a) is brought, at the irregular surface portion 18a, into tight contact with the first straight inner peripheral surface 13 of the inner peripheral surface 12 of the outer ring 2, and the outer peripheral surface of the second circumferential portion 6a is brought into tight contact with the second straight inner peripheral surface 14. The first circumferential portion 5a formed with the irregular surface portion 18a is fitted in tight contact with the first straight inner peripheral surface 13 that is a smooth surface without an irregular corrugated shape.

The raceway members 4a and 4b each are provided with a slight gap between the arcuate portion between the first straight inner peripheral surface 13 and the second straight inner peripheral surface 14 and a middle portion of the outer peripheral surface of each of the raceway members 4a and 4b. This allows the outer peripheral surface of each of the raceway members 4a and 4b to be reliably brought into contact with the first straight inner peripheral surface 13 and the second straight inner peripheral surface 14 when the raceway members 4a and 4b are press-fitted.

Further, in FIGS. 5 and 8, in the raceway member 4b (4a), the outer peripheral surface of the first circumferential portion 5a has the third straight outer peripheral surface 16 that is in contact with the first straight inner peripheral surface 13 formed in the inner peripheral surface 12 of the outer ring 2 and extends straight in parallel with the axis C of the bearing assembly. The irregular surface portion 18a is formed in the third straight outer peripheral surface 16.

The outer peripheral surface of the second circumferential portion 6a has the fourth straight outer peripheral surface 17 that is in surface contact with the second straight inner peripheral surface 14 formed in the inner peripheral surface 12 of the outer ring 2 and extends straight in a direction inclined with respect to the axis C of the bearing.

In FIG. 1, the second axial load receiving thick portion 38 that is raised radially outwards from the middle diameter outer peripheral surface 23 of the outer peripheral surface 11 of the inner shaft 1 and stepped to the large diameter outer peripheral surface 24 is formed closer to one end of the inner shaft 1. The receiving thick portion 38 has an axial width gradually decreasing radially outwards. Part of the middle diameter outer peripheral surface 23 is the first straight outer peripheral surface 26 that extends straight in parallel with the axis C, and an inclined peripheral surface of the receiving thick portion 38 is the second straight outer peripheral surface 27 that extends straight in a direction inclined with respect to the axis C at a certain inclination angle.

The raceway member 4c is press-fitted from outside to a side portion of the receiving thick portion 38 from the other end of the inner shaft 1. As shown in FIGS. 6 and 9, the inner peripheral surface of the first circumferential portion 5b of the raceway member 4c is brought, at the irregular surface portion 18b, into tight contact with the first straight outer peripheral surface 26 of the outer peripheral surface 11 of the inner shaft 1. The inner peripheral surface of the second circumferential portion 6b is brought into tight contact with the second straight outer peripheral surface 27. The first circumferential portion 5b formed with the irregular surface portion 18b is fitted in tight contact with the first straight outer peripheral surface 26 that is a smooth surface without an irregular corrugated shape.

In FIGS. 6 and 9, in the third raceway member 4c, the inner peripheral surface of the first circumferential portion 5b has the third straight inner peripheral surface 28 that is in contact with the first straight outer peripheral surface 26 formed in the outer peripheral surface 11 of the inner shaft 1. The irregular surface portion 18b is formed in the third straight inner peripheral surface 28. The inner peripheral surface 29 of the second circumferential portion 6b has the fourth straight inner peripheral surface 29 that is in surface contact with the second straight outer peripheral surface 27 formed in the outer peripheral surface 11 of the inner shaft 1.

As described above, according to the vehicular-wheel bearing assembly of the present invention, the raceway member 4 that is the separate member from the inner shaft 1 and the outer ring 2 is used, thereby allowing the entire raceway member 4 before assembly to be subjected to heat treatment for increasing hardness of the raceway surface. This eliminates the need for partial heat treatment of the inner shaft 1 and the outer ring 2, thereby reducing production costs and equipment costs. The raceway member 4 with a curved section having increased hardness due to heat treatment can be used to receive a radial load and an axial load of the vehicular-wheel bearing assembly.

Even if the counterpart member mounted to the outer ring 2 of the vehicular-wheel bearing assembly is made of, for example, aluminum, the outer ring 2 is made of aluminum to prevent electric pitting between the bearing assembly and the counterpart member. This prevents deposition of aluminum on the bearing assembly and avoids inability to remove the bearing assembly. Further, the raceway surface having predetermined high hardness can be obtained.

The raceway member 4 can be brought into surface contact with the first straight (inner or outer) peripheral surface and the second straight (inner or outer) peripheral surface of the mounting peripheral surface. Thus, a radial load applied and an axial load can be reliably transmitted to the inner shaft 1 and the outer ring 2 via the first straight (inner or outer) peripheral surface and the second straight (inner or outer) peripheral surface, respectively, and a load in the direction of a contact angle can be received. Also, contact surface pressure can be reduced.

Further, the irregular surface portions 18a and 18b are used to allow the raceway member 4 to be firmly mounted without circumferential movement of the raceway member 4 even if a large load is applied to the raceway member 4. Further, a rotation of the raceway member 4 can be prevented with a simple configuration without reducing accuracy of the raceway surface of the raceway member 4. The raceway member 4 can be easily assembled, thereby reducing production man-hour.

The vehicular-wheel bearing assembly of the present invention is not limited to the shown configuration but may be of different configuration within the scope of the invention. The present invention has been described as the vehicular-wheel bearing assembly for a driven wheel, but may be applied to a vehicular-wheel bearing assembly for a drive wheel though not shown.

Next, in FIG. 2, a guide member 8 that is fitted in one end 1a of the inner shaft 1 included in the vehicular-wheel bearing assembly of the present invention and a mounting portion thereof will be described. FIG. 2 is a drawing of longitudinal section of the vehicular-wheel bearing assembly according to one embodiment of the present invention.

The vehicular-wheel bearing assembly generally includes the outer ring 2, the inner shaft 1 (hub wheel) provided radially inward of the outer ring 2, and the two rows of balls 3a and 3b as rolling elements rollably provided between the inner shaft 1 and the outer ring 2 in angular contact with the inner shaft 1 and the outer ring 2. The two rows of balls 3a and 3b are in contact with the inner shaft 1 and the outer ring 2, respectively, at a predetermined contact angle. The vehicular-wheel bearing assembly includes a double row angular contact ball bearing 10.

In the vehicular-wheel bearing assembly, the annular raceway members 4a and 4b that are separate members from the outer ring 2 and have raceway surfaces for the rolling elements are provided on the inner peripheral surface 12 of the outer ring 2, in order to configure raceway surfaces for the balls 3a and 3b.

The inner shaft 1 has the shaft portion 31 having a circular section and extending longitudinally along the axis C of the bearing assembly, and a flange portion 7 formed at one end 1a on an outer peripheral side of the shaft portion 31, extending radially outwards, and to which a wheel side member is mounted. The wheel side member includes a wheel 41 and a brake rotor 42.

The inner ring member 9 having the first inner ring raceway that is a single raceway is fitted from outside to the small diameter outer peripheral surface 22 closer to the other end of the shaft portion 31 of the inner shaft 1. The single second inner ring raceway is formed on the middle diameter outer peripheral surface 23 in midstream in an axial direction of the shaft portion 31. A large diameter outer peripheral surface 24 closer to one end 1a of the shaft portion 31 and a base of the flange portion 7 are seal surfaces of a seal member 35 provided between the inner shaft 1 and the outer ring 2. At the other end of the shaft portion 31, an outer peripheral end is extended radially outwards to form a caulking portion 32, and the caulking portion 32 retains and secures the inner ring member 9 to the shaft portion 31. The inner ring member 9 fitted from outside to the inner shaft 1 may be a conventionally known inner ring used in an angular contact ball bearing, and may be made of conventionally used material, for example, stainless steel.

The outer ring 2 has the cylindrical portion 34 coaxial with the inner shaft 1, and a flange portion 33 formed radially outwards on an outer periphery of the cylindrical portion 34. The vehicular-wheel bearing assembly is secured to an unshown vehicle body via the flange portion 33.

The first and second raceway members 4a and 4b that form the first and second outer ring raceways are provided on the inner peripheral surface 12 of the cylindrical portion 34 of the outer ring 2 axially via the axial load receiving thick portion 36. The receiving thick portion 36 is formed to be raised radially inwards in the middle of the inner peripheral surface 12 of the outer ring 2. The two rows of balls 3a and 3b and two crown type cages 37a and 37b are provided between the raceway members 4a and 4b provided on the outer ring 2 and the first and second inner ring raceways on the inner shaft 1.

The raceway members 4a and 4b (hereinafter also collectively referred to as raceway members 4) are pressed products formed by pressing a plate material so as to have a generally annular shape and a curved section. The raceway members 4 may be made of a carbon steel sheet, for example, SK5 or S75CM that can be pressed and be subjected to heat treatment (quenching and tempering).

The raceway members 4a and 4b provided on the inner peripheral surface 12 of the outer ring 2 have recessed inner peripheral surfaces to form raceway surfaces.

The raceway members 4a and 4b pressed into a predetermined shape and subjected to heat treatment are press-fitted in the inner peripheral surface 12 of the outer ring 2. The raceway members 4a and 4b previously subjected to heat treatment and having increased hardness is used to increase life. Further, the raceway members 4a and 4b are pressed to have the curved sections, and thus the raceway surfaces have high dimensional accuracy and a good surface condition. Thus, after assembly of the raceway members 4a and 4b, dimension adjustment of the raceway surface can be omitted, or dimension adjustment time can be reduced.

FIG. 1 shows another embodiment of the present invention, and the raceway member 4c is also mounted to the inner shaft 1.

As shown in FIGS. 1 and 2, the guide member 8 is fitted in one end 1a of the inner shaft 1. The guide member 8 serves as a guide for mounting the wheel side member to the mounting surface 7a of the flange portion 7. As shown in FIG. 2, the wheel side member includes the wheel 41 and the brake rotor 42.

The guide member 8 is a separate member from the inner shaft 1 (flange portion 7), and press-fitted by a press in a recessed hole 39 formed in an end surface of one end 1a of the inner shaft 1 without using adhesion or welding. The guide member 8 protrudes beyond the mounting surface 7a of the flange portion 7. The guide member 8 can be mounted by press-fitting in one end 1a of the inner shaft 1, and thus can be easily mounted, thereby reducing production man-hour.

The guide member 8 may be metal plated with material having a smaller difference in ionization tendency from metal material of the wheel side member than iron. Further, the plated steel sheet can be pressed into a stepped closed-end short cylindrical shape. Specifically, when the wheel side member is made of aluminum, and the guide member 8 is, for example, zinc plated, a difference in ionization tendency from aluminum can be smaller than iron. This prevents electric pitting due to water entering the gap between the wheel side member mounted to the flange portion 7 and the guide member 8.

Figure 10:
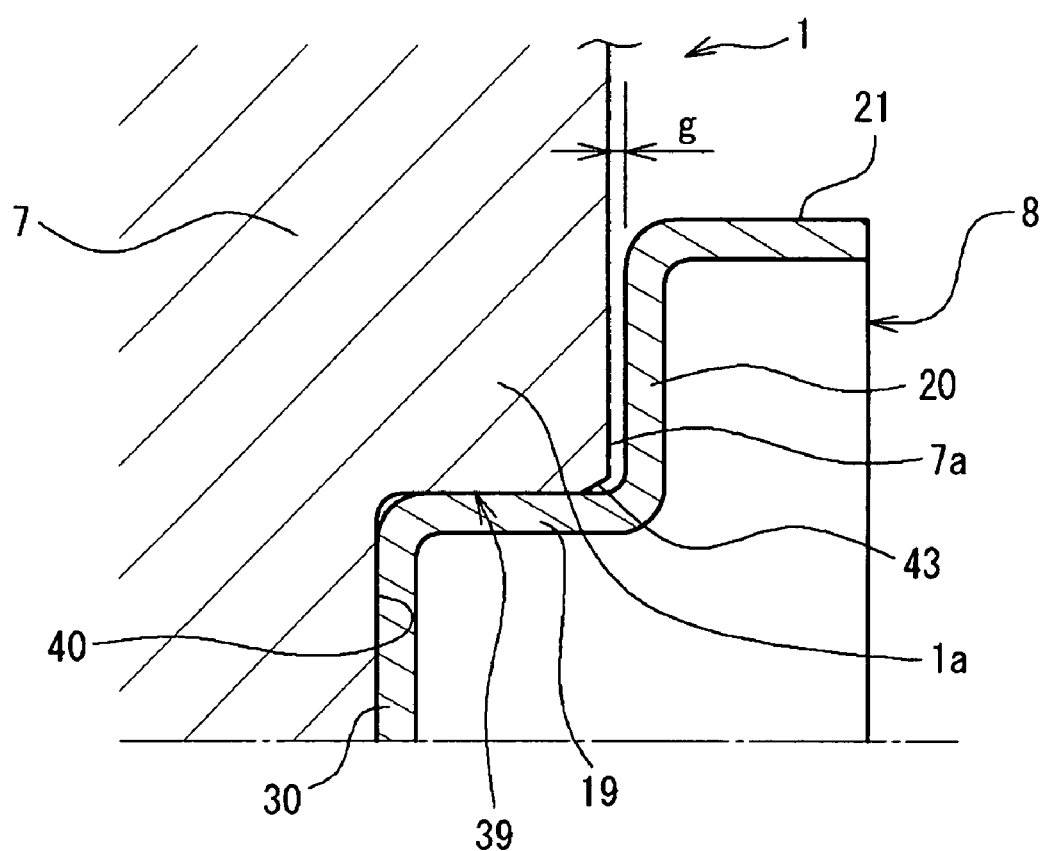
FIG. 10 is a half-cut drawing of longitudinal section illustrating a mounting structure of a guide member in the present invention.

FIG. 10 is a half-cut drawing of longitudinal section of the guide member 8 fitted in one end 1a of the shaft portion 1. In FIGS. 2 and 10, the guide member 8 has a short cylindrical fitting portion 19 fitted in the recessed hole 39 having a circular section and formed in one end 1a of the inner shaft 1, an annular flat portion 20 extending radially outwards from one axial end of the fitting portion 19, and a cylindrical portion 21 extending in a bent manner from an outer peripheral edge of the annular flat portion 20 in parallel with the axis. Thus, the cylindrical portion 21 is coaxial with the short cylindrical fitting portion 19, and has a larger diameter than the fitting portion 19. A back face of the annular flat portion 20 of the guide member 8 and the mounting surface 7a of the flange portion 7 face each other with a gap g therebetween without contact.

The mounting surface 7a of the flange portion 7 is formed as a plane perpendicular to the axis C of the bearing assembly. The guide member 8 is mounted so that the annular flat portion 20 of the guide member 8 is a plane perpendicular to the axis C.

Further, in FIG. 10, a positioning portion 40 against which the axial other end surface of the fitting portion 19 of the guide member 8 abuts is formed in the recessed hole 39 in the inner shaft 1. The positioning portion 40 in FIG. 10 is a bottom wall surface of the recessed hole 39. The positioning portion 40 is a control member that axially positions the guide member 8 when the guide member 8 is press-fitted in the recessed hole 39. The fitting portion 19 of the guide member 8 has a bottom wall 30 and has a closed-end short cylindrical shape. The bottom wall 30 abuts against the positioning portion 40 of the recessed hole 39 to fit the guide member 8 in the recessed hole 39 so that a predetermined gap g is provided between the annular flat portion 20 of the guide member 8 and the mounting surface 7a of the flange portion 7. Besides the bottom wall surface of the recessed hole 30, the positioning portion 40 may be a protruding portion or an inner flange portion protruding inwards from an inner peripheral surface of the recessed hole 39, through not shown.

It is preferable that the outer peripheral surface of the fitting portion 19 of the guide member 8 fits the inner peripheral surface of the recessed hole 39 in tight contact therewith, and the outer peripheral surface of the fitting portion 19 is formed with an irregular surface portion (not shown) for retaining. For example, the outer peripheral surface of the fitting portion 19 may have a serration shape.

A chamfered portion 43 is formed at an opening corner of the recessed hole 39 to prevent the annular flat portion 20 of the guide member 8 from coming into contact with the flange portion 7 and the inner shaft 1 also at an inner peripheral edge of the annular flat portion 20 of the guide member 8.

The value of the gap g between the mounting surface 7a of the flange portion 7 and the annular flat portion 20 of the guide member 8 that faces the mounting surface 7a is the sum of an axial displacement amount by deflection of the flange portion 7 due to application of a load, and a margin dimension. Thus, even if the flange portion 7 is deformed by a supposed axial displacement amount of the flange portion 7, a gap of the margin dimension can remain. Even if the flange portion 7 is deformed in a falling direction, the mounting surface 7a of the flange portion 7 does not come into contact with the annular flat portion 20 of the guide member 8. Further, with the gap g, the deformation of the flange portion 7 does not cause the guide member 8 to restrain deformation of the flange portion 7, and the flange portion 7 can be elastically deformed according to a load applied. Thus, no stress concentration occurs in the flange portion 7. The margin dimension may be 0.5 mm or larger and 1.5 mm or smaller, and prevents foreign matter from accumulating in the gap g.

Figure 11:
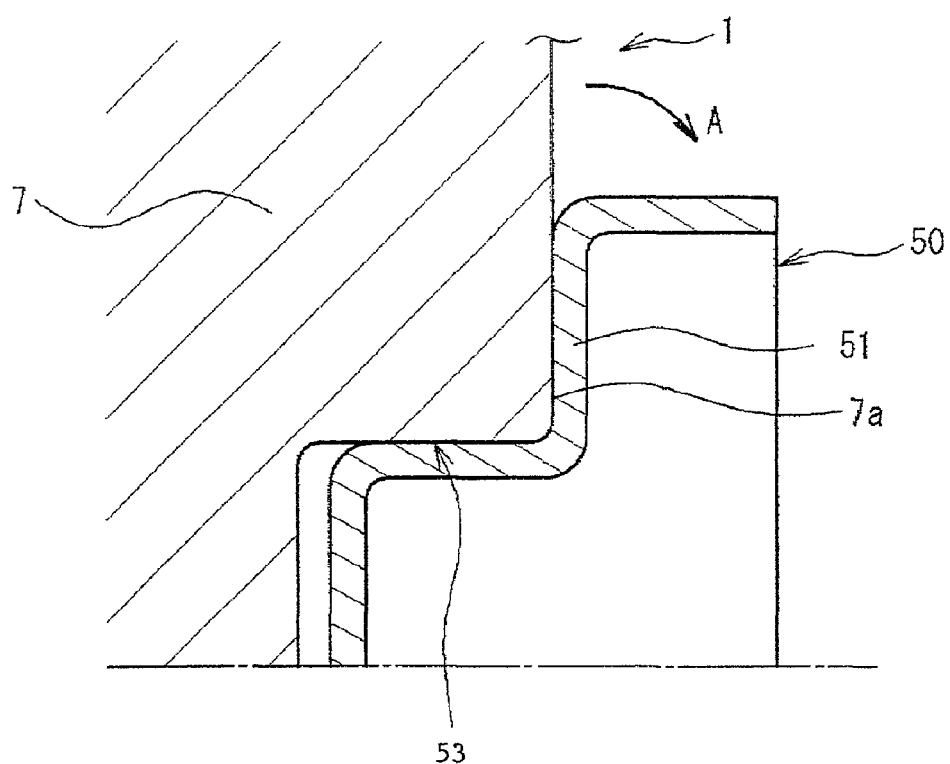
FIG. 11 is a half-cut drawing of longitudinal section illustrating a mounting structure of a guide member in a comparative example.

An operation of the mounting structure of the guide member 8 of the present invention will be described with reference to FIG. 10, and FIG. 11 showing a comparative example. In FIG. 11, an annular flat portion 51 of a guide member 50 is in contact with a mounting surface 7a of a flange portion 7 without a gap. In this case, if a load is applied to the flange portion 7 and the flange portion 7 is deformed in a falling direction as indicated by arrow A, the mounting surface 7a of the flange portion 7 also falls in an inclined manner from a surface perpendicular to an axis. Thus, the guide member 50 press-fitted in a recessed hole 53 is pushed out in a removal direction by the mounting surface 7a in contact therewith. According to the present invention, however, as shown in FIG. 10, even if the flange portion 7 is deformed in a falling direction, the deformation can be relieved in the gap g, and the guide member 8 simply press-fitted in the inner shaft 1 or the outer ring 2 is not pushed out by the deformation of the flange portion 7, thereby preventing removal of the guide member 8, and allowing the guide member 8 to be maintained in an initial fitted state in assembly.

Further, in the comparative example in FIG. 11, no gap is provided between the annular flat portion 51 of the guide member 50 and the flange portion 7. Thus, a moment load in the falling direction is applied to the flange portion 7 as indicated by the arrow A with high rigidity of the guide member 50, and the guide member 50 restrains the deformation of the flange portion 7. This may cause local stress concentration at a base of the flange portion 7 in contact with an outer peripheral edge of the annular flat portion 51. The stress concentration at the base of the flange portion 7 may cause distortion of a raceway surface provided on an outer peripheral surface 11 of an inner shaft 1 to affect the function of balls 3a and 3b. However, according to the present invention in FIG. 10, the gap g is provided to allow the flange portion 7 to be freely elastically deformed according to a load applied. This causes no stress concentration at the base of the flange portion 7, and does not affect the raceway surface and the balls 3a and 3b.

Further, if a cylindrical guide portion protruding beyond the mounting surface 7a is formed integrally with the flange portion 7 at the base of the flange portion 7, a section of the flange portion 7 is sharply increased at the base to restrain deformation of the flange portion 7, and thus application of a load causes stress concentration at the base of the flange portion 7.

However, the guide member 8 is the separate member from the flange portion 7 and the gap g is provided, and thus deformation of the flange portion 7 is not restrained by the guide member 8, and can be freely elastically deformed according to a load applied, thereby causing no stress concentration.

In the present invention, the outer ring 2 is made of the same kind of material as a counterpart member connected to the outer ring 2. For example, when a mounting portion of a counterpart member on a vehicle body connected to the outer ring 2 is made of aluminum, the outer ring 2 is also made of aluminum. This prevents water entering a gap between the bearing assembly and the counterpart member from causing electric pitting therebetween. Further, the outer ring 2 may be made of cast aluminum to increase productivity. Specifically, the raceway members 4a and 4b can be mounted to the outer ring 2 made of cast aluminum and having the inner peripheral surface 12 that is not subjected to finishing such as cutting or polishing for forming the raceway surface. This can reduce machining costs, simplify production facilities, and increase productivity.

The outer ring 2 is made of the same kind of material as the counterpart member mounted thereto, and the word "the same kind" includes the case of the same material or components, and the case of the same (substantially the same) ionization tendency with different material or components.

Specifically, in the present invention, the outer ring 2 can be made of material such as aluminum that cannot be increased in hardness by heat treatment. Further, the inner shaft 1 and the outer ring 2 can be made of materials having high workability, high productivity, and high functionality.

According to the vehicular-wheel bearing assembly of the present invention having the above described configurations, the guide member 8 is the separate member from the inner shaft 1 or the outer ring 2 having the flange portion 7, and thus application of the load to the flange portion 7 does not cause local stress concentration on the flange portion 7. The guide member 8 can be mounted simply by press-fitting in the inner shaft 1 or the outer ring 2, and thus can be easily mounted, thereby reducing production man-hour.

Further, even if the load is applied to cause deformation of the flange portion 7, the mounting surface 7a of the flange portion 7 and the guide member 8 do not come into contact with each other, thereby preventing the annular flat portion 20 of the guide member 8 press-fitted from being pushed out by the mounting surface 7a of the flange portion 7 elastically deformed and preventing the guide member 8 from being removed from the inner shaft 1 or the outer ring 2.

In the embodiments in FIGS. 1 and 2, the inner shaft 1 is a rotation side, the flange portion 7 to which the wheel side member is mounted is formed in the inner shaft 1, and the guide member 8 is fitted in the recessed hole 39 of the inner shaft 1. However, the present invention may be applied to a bearing assembly of an outer ring rotation type including a flange portion 7 in an outer ring 2 though not shown. In this case, a guide member 8 is fitted in a hole formed by an inner peripheral surface of an end of the outer ring 2.

Further, the vehicular-wheel bearing assembly of the present invention is not limited to the shown configuration but may be of different configuration within the scope of the invention. The present invention has been described as the vehicular-wheel bearing assembly for a driven wheel, but may be applied to a vehicular-wheel bearing assembly for a drive wheel though not shown.

The invention claimed is:

1. A vehicular-wheel bearing assembly comprising:
an inner shaft;
an outer ring provided around the inner shaft; and
a rolling element provided between said inner shaft and said outer ring,
wherein an annular raceway member with a curved section that is a separate member from said inner shaft and said outer ring and has a raceway surface for said rolling element is provided on a mounting peripheral surface of at least one of an outer peripheral surface of said inner shaft and an inner peripheral surface of said outer ring, and said mounting peripheral surface has a first straight peripheral surface that is in contact with said raceway member and extends straight in parallel with an axis, and a second straight peripheral surface that is in contact with said raceway member and extends straight in a direction inclined with respect to the axis, and
wherein said raceway member has a third straight peripheral surface that is in surface contact with said first straight peripheral surface and extends straight in parallel with the axis, and a fourth straight peripheral surface that is in surface contact with said second straight peripheral surface and extends straight in a direction inclined with respect to the axis.

2. The vehicular-wheel bearing assembly according to claim 1, wherein an inclination angle of said second straight peripheral surface with respect to said first straight peripheral surface in a longitudinal section is 30° or larger and 80° or smaller.

3. The vehicular-wheel bearing assembly according to claim 1, wherein said raceway member is a pressed product formed by pressing a plate material so as to have a generally annular shape and a curved section, and said raceway member has a thickness of 1.5 mm or larger and 4 mm or smaller.

4. The vehicular-wheel bearing assembly according to claim 1, wherein the annular raceway member has an irregular surface portion facing and engaging the first straight peripheral surface.

5. The vehicular-wheel bearing assembly according to claim 1, wherein said annular raceway member stands between said rolling element and said mounting peripheral surface, and said rolling element is provided between said inner shaft and said outer ring in angular connection with said mounting peripheral surface via said annular raceway member.

6. A vehicular-wheel bearing assembly comprising:
an inner shaft;
an outer ring provided around the inner shaft; and
a rolling element provided between said inner shaft and said outer ring,
wherein an annular raceway member with a curved section that is a separate member from said inner shaft and said outer ring and has a raceway surface for said rolling element is provided on at least one of an outer peripheral surface of said inner shaft and an inner peripheral surface of said outer ring, and an irregular surface portion for preventing rotation is formed on a peripheral surface of said raceway member,
wherein said raceway member has a first circumferential portion that receives a radial load, and a second circumferential portion that is provided on a base end side of the first circumferential portion and receives an axial load, and said irregular surface portion is formed on a peripheral surface of said first circumferential portion, and
wherein said rolling element constituted by a ball is provided on a raceway surface side of said raceway member, and said irregular surface portion is formed in an area closer to a tip of said first circumferential portion than a surface perpendicular to an axis passing through the center of said ball, on the peripheral surface of said first circumferential portion of the raceway member.

7. The vehicular-wheel bearing assembly according to claim 6, wherein said annular raceway member stands between said rolling element and said at least one of the outer peripheral surface of said inner shaft and the inner peripheral surface of said outer ring, and said rolling element is provided between said inner shaft and said outer ring in angular connection with said at least one of the outer peripheral surface of said inner shaft and the inner peripheral surface of said outer ring via said annular raceway member.

8. A vehicular-wheel bearing assembly comprising:
an outer ring;
an inner shaft provided in the outer ring rotatably via a rolling element;
a flange portion provided on any one of said inner shaft and said outer ring and to which a wheel side member is mounted; and
a guide member that is fitted as a separate member in a hole formed in an end of said inner shaft or said outer ring, protrudes beyond a mounting surface of said flange portion for the wheel side member, and serves as a guide for mounting said wheel side member to said flange portion,
wherein said guide member has a fitting portion fitted in said hole, an annular flat portion extending radially outwards from the fitting portion, and a cylindrical portion extending in a bent manner from an outer peripheral edge of the annular flat portion in parallel with an axis, and said annular flat portion and said flange portion do not come into contact with each other with a gap therebetween, and
wherein an annular raceway member with a curved section that is a separate member from said inner shaft and said outer ring and has a raceway surface for said rolling element is provided on at least one of an outer peripheral surface of said inner shaft and an inner peripheral surface of said outer ring, and
wherein the annular raceway member has an irregular surface portion facing and engaging a first straight peripheral surface of the at least one of an outer peripheral surface of said inner shaft and an inner peripheral surface of said outer ring, and the first straight peripheral surface is in contact with said raceway member and extends straight in parallel with an axis of the inner shaft.

9. The bearing assembly according to claim 8, wherein the value of said gap is the sum of an axial displacement amount by deflection of said flange portion due to application of a load, and a margin dimension.

* * * * *